(12) United States Patent
Torisaka

(10) Patent No.: US 9,616,694 B2
(45) Date of Patent: Apr. 11, 2017

(54) IMAGE RECORDING METHOD

(71) Applicant: CANON KABUSHIKI KAISHA, Tokyo (JP)

(72) Inventor: Yoshitaka Torisaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/723,118

(22) Filed: May 27, 2015

(65) Prior Publication Data

US 2015/0343488 A1 Dec. 3, 2015

(30) Foreign Application Priority Data

May 30, 2014 (JP) ................. 2014-111946

(51) Int. Cl.
| | | |
|---|---|---|
| *B41M 5/00* | (2006.01) | |
| *C09D 11/00* | (2014.01) | |
| *C09D 11/10* | (2014.01) | |
| *C09D 11/322* | (2014.01) | |
| *B41M 7/00* | (2006.01) | |
| *B05D 1/36* | (2006.01) | |

(52) U.S. Cl.
CPC ........ *B41M 5/0017* (2013.01); *B41M 5/0011* (2013.01); *B41M 7/0018* (2013.01); *C09D 11/005* (2013.01); *C09D 11/10* (2013.01); *C09D 11/322* (2013.01); *B05D 1/36* (2013.01)

(58) Field of Classification Search
None
See application file for complete search history.

(56) References Cited

U.S. PATENT DOCUMENTS

2010/0245508 A1* 9/2010 Ikeda ................... B41M 5/0017
  347/95
2012/0320121 A1* 12/2012 Arai ..................... C09D 11/322
  347/20

FOREIGN PATENT DOCUMENTS

| JP | 2010-69814 A | 4/2010 |
| JP | 2012-171216 A | 9/2012 |
| JP | 2012-224739 A | 11/2012 |
| JP | 2013-18948 A | 1/2013 |
| JP | 2013-163370 A | 8/2013 |
| JP | 2013-244601 A | 12/2013 |

* cited by examiner

*Primary Examiner* — Michael P Rodriguez
(74) *Attorney, Agent, or Firm* — Canon U.S.A. Inc., IP Division

(57) ABSTRACT

An image recording method includes a process of applying an ink containing a pigment to a recording medium, and a process of applying a liquid composition containing organic acid to the recording medium in such a manner as to be at least partially overlapped with a region to which the ink is applied. The content (% by mass) of the organic acid in the liquid composition is 10% by mass or more based on the total amount of the liquid composition. The content (% by mass) of an organic solvent in the liquid composition is 5% by mass or more based on the total amount of the liquid composition. The content (% by mass) of an organic solvent having a hydroxyl group in the liquid composition is 4% by mass or less based on the total amount of the liquid composition.

15 Claims, 1 Drawing Sheet

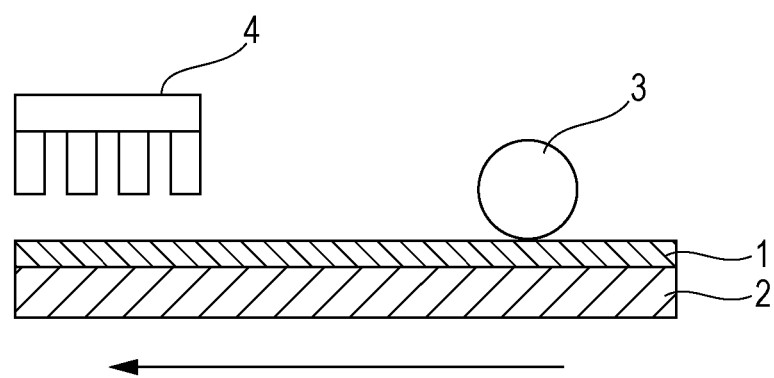

IMAGE RECORDING METHOD

BACKGROUND OF THE INVENTION

Field of the Invention

The present invention relates to an image recording method.

Description of the Related Art

In recent years, an image recording method has drawn attention which employs a so-called two-component reaction system in which a liquid substantially not containing a coloring material (hereinafter referred to as a "liquid composition") is used with ink mainly aiming at a further improvement of image quality from the viewpoint of an increase in image quality and an increase in recording speed of recorded images. To the liquid composition to be used in such an image recording method, a component of aggregating coloring materials, such as pigments, in ink is usually added.

As specific related arts, image recording methods employing a two-component reaction system have been proposed in which ink containing polymer fine particles containing anionic polymer and a pigment and a liquid composition containing organic acid are used and an aggregation reaction caused by the contact of the ink and the liquid composition is utilized, for example (Japanese Patent Laid-Open Nos. 2013-18948 and 2010-69814). According to such methods, images can be recorded which have a higher resolution, a higher image density, and less blurring as compared with a former one-component printing system using only ink. Furthermore, the image recording method employing a two-component reaction system has a characteristic that the drying rate after printing is high.

SUMMARY OF THE INVENTION

The present invention provides an image recording method including a process of applying an ink containing a pigment to a recording medium, and a process of applying a liquid composition containing organic acid to the recording medium in such a manner as to be at least partially overlapped with a region to which the ink is applied, in which the content (% by mass) of the organic acid in the liquid composition is 10% by mass or more based on the total amount of the liquid composition, the content (% by mass) of an organic solvent in the liquid composition is 5% by mass or more based on the total amount of the liquid composition, and the content (% by mass) of an organic solvent having a hydroxyl group in the liquid composition is 4% by mass or less based on the total amount of the liquid composition.

Further features of the present invention will become apparent from the following description of exemplary embodiments with reference to the attached drawing.

BRIEF DESCRIPTION OF THE DRAWINGS

FIGURE is a cross sectional view showing an example of an image recording apparatus.

DESCRIPTION OF THE EMBODIMENTS

An examination of the present inventors has showed that when printing has been performed at a high speed using a liquid composition after long-term storage according to the image recording method proposed in Japanese Patent Laid-Open No. 2013-18948, blurring and density unevenness have occurred in images, so that it has been difficult to obtain a high definition image. Moreover, even when printing has been performed according to the image recording method proposed in Japanese Patent Laid-Open No. 2010-69814, a high definition image free from blurring and density unevenness has not been able to be obtained under high-speed recording.

Accordingly, the present invention provides an image recording method capable of obtaining a high definition image free from blurring and density unevenness even when recording is performed at a high speed using a liquid composition after long-term storage.

Image Recording Method

Hereinafter, an embodiment of the present invention is described but the present invention is not limited to the following embodiment. The present inventors have first examined a reason why a high definition image free from blurring has not been able to be obtained when recording has been performed at a high speed using a liquid composition after long-term storage. As a result, it has been found that when a liquid composition has been stored over a long period of time, organic acid in the liquid composition has reacted with an organic solvent having a hydroxyl group in the liquid composition to generate an ester compound, so that the content of the organic acid in the liquid composition has decreased. Therefore, it is assumed that the aggregation property of a pigment in ink becomes insufficient, so that it has been difficult to obtain a high definition image free from blurring in high-speed recording.

The present inventors have examined a method for suppressing image blurring under the assumption described above, and has found a configuration of an image recording method according to an aspect of the present invention. More specifically, the image recording method according to an aspect of the present invention has a process of applying an ink containing a pigment to a recording medium, and a process of applying a liquid composition containing organic acid to the recording medium in such a manner as to be at least partially overlapped with a region to which the ink is applied. The content (% by mass) of the organic acid in the liquid composition is 10% by mass or more based on the total amount of the liquid composition. The content (% by mass) of an organic solvent in the liquid composition is 5% by mass or more based on the total amount of the liquid composition. The content (% by mass) of an organic solvent having a hydroxyl group in the liquid composition is 4% by mass or less based on the total amount of the liquid composition. Hereinafter, the details of the image recording method according to an aspect of the present invention are described.

Liquid Composition

The liquid composition to be used in the image recording method according to an aspect of the present invention contains organic acid. The liquid composition may further contain various components, such as water, an organic solvent, a surfactant, and a pH adjuster.

Organic Acid

The organic acid in the liquid composition can aggregate the pigment in the ink by contacting the ink. Therefore, when the liquid composition containing organic acid is applied onto a recording medium, the pigment in the ink aggregates due to the action of the organic acid in the liquid composition, so that bleeding and beading are suppressed. Therefore, a good image is recorded.

The content (% by mass) of the organic acid in the liquid composition is 10% by mass or more, preferably 10% by mass or more and 95% by mass or less, more preferably 15% by mass or more and 90% by mass or less, and particularly preferably 20% by mass or more and 80% by mass or less based on the total amount of the liquid composition. By the use of the liquid composition in which the content of the organic acid is 10% by mass or more, a high definition image in which blurring is suppressed can be recorded. When the content of the organic acid in the liquid composition is less than 10%, the aggregation property of the ink becomes insufficient, so that a high definition image free from blurring cannot be obtained.

Examples of the organic acid include, for example, oxalic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, 1,2,3-propane tricarboxylic acid, tartaric acid, lactic acid, pyrrolidone carboxylic acid, pyrone carboxylic acid, pyrrole carboxylic acid, furancarboxylic acid, pyridine carboxylic acid, coumarin acid, thiophene carboxylic acid, nicotinic acid, oxysuccinic acid, dioxysuccinic acid, and the like. These organic acids can be used alone or in combination of two or more kinds thereof.

Organic Solvent

The liquid composition to be used in the image recording method according to an aspect of the present invention may contain solvents, such as water and an organic solvent. The content (% by mass) of the organic solvent in the liquid composition needs to be 5% by mass or more based on the total amount of the liquid composition. Furthermore, the content is preferably 5% by mass or more and 60% by mass or less, more preferably 10% by mass or more and 40% by mass or less, and particularly preferably 15% by mass or more and 30% by mass or less. By setting the content of the organic solvent within the range mentioned above, the application property of the liquid composition to a recording medium can be further improved, so that density unevenness can be suppressed.

From the viewpoint of the long-term storageability of the liquid composition, it is suitable to use an organic solvent not having a hydroxyl group. In the present invention, the description "The long-term storageability of liquid composition is good." means that the amount of the organic acid in the liquid composition is difficult to decrease or does not substantially decrease due to the esterification reaction of the organic acid which is a component of increasing the viscosity of the ink and the organic solvent having a hydroxyl group.

Examples of the organic solvent not having a hydroxyl group include, for example, glycol diethers, such as diethylene glycol diethylether, triethylene glycol butyl methyl ether, tetraethylene glycol dimethyl ether, propylene glycol dimethyl ether, dipropylene glycol dimethyl ether, polyethylene glycol dimethyl ether 1000, and polyethylene glycol dimethyl ether 2000; alkylene glycol monoalkyl ether acetates, such as ethylene glycol monobutyl ether acetate; pyrrolidones, such as 2-pyrrolidone and N-methyl-2-pyrrolidone; sulfur containing compounds, such as tetramethylene sulfone and dimethylsulfoxide, and the like. These organic solvents can be used alone or in combination of two or more kinds thereof. These organic solvents can also be mixed with water for use.

Among the organic solvents mentioned above, glycol diether is suitable. By the use of glycol diether, an increase in viscosity of the liquid composition after long-term storage can be suppressed. The molecular weight of the glycol diether is preferably 250 or more and more preferably 1,000 or more and 10,000 or less. By the use of glycol diether having a molecular weight of 250 or more, the effect of suppressing the viscosity increase described above is efficiently demonstrated, and an image in which blurring is suppressed can be recorded.

As the organic solvent to be blended in the liquid composition, organic solvents having a hydroxyl group can also be used. The content (% by mass) of the organic solvent having a hydroxyl group in the liquid composition needs to be 4% by mass or less based on the total amount of the liquid composition. By setting the content of the organic solvent having a hydroxyl group in the liquid composition to 4% by mass or less, the long-term storageability of the liquid composition can be improved. Therefore, even when recording is performed at a high speed, a high definition image free from blurring can be obtained. The content (% by mass) of the organic solvent having a hydroxyl group in the liquid composition is preferably 1% by mass or less. Furthermore, it is suitable that a treatment agent does not substantially contain (0% by mass or more) the organic solvent having a hydroxyl group.

Examples of the organic solvent having a hydroxyl group which can be blended in the liquid composition when the content is equal to or less than the predetermined content include, for example, diethylene glycol monobutyl ether, 1,5-pentane diol, 1,2-hexane diol, glycerol, and the like.

Other Components

In the liquid composition, surfactants can be blended in order to adjust the surface tension. Examples of the surfactants include nonionic surfactants, cationic surfactants, anionic surfactants, and the like can be appropriately selected as necessary for use.

In the liquid composition, neutralizers can be blended in order to adjust the hydrogen ion density (pH). Examples of the neutralizers include, for example, potassium hydroxide, calcium hydroxide, sodium hydroxide, and the like. In the liquid composition, an antifoaming agent, an antiseptic, an antifungal agent, and the like can be appropriately blended as necessary in order to impart desired properties.

Ink

The ink to be used in the image recording method according to an aspect of the present invention is a pigment ink containing a pigment as the essential component. The ink may usually contain various components, such as polymer particles, pigment dispersants, e.g., a water-soluble polymer, water, organic solvents, surfactants, and pH adjusters.

Pigment

The type of the pigment is not particularly limited and known black pigments and organic pigments can be used. As the black pigments, it is suitable to use carbon black. As the organic pigments, pigments denoted by the C.I. (Color Index) number can be used. The content (% by mass) of the pigment in the ink is preferably 0.2% by mass or more and 15.0% by mass or less and more preferably 0.6% by mass or more and 10.0% by mass or less based on the entire ink mass.

Polymer Particles

It is suitable for the ink to be used in the image recording method according to an aspect of the present invention to contain polymer particles. The "polymer particles" in the present invention refer to polymer which can be present in the form of a dispersion in a solvent in the state of having a particle diameter. The volume average particle diameter ($D_{50}$) of the polymer particles is preferably 10 nm or more and 1,000 nm or less and more preferably 40 nm or more and 500 nm or less.

The volume average particle diameter of the polymer particles can be measured using a polymer particle dispersion, such as ink diluted 50 times (in terms of volume) with pure water, as a measurement sample and using a particle size distribution meter of a dynamic light scattering system, for example. As the particle size distribution meter of a dynamic light scattering system, "UPA-EX150" (Trade name, manufactured by Nikkiso) and the like can be used, for example. The measurement conditions may be set as follows: SetZero: 30 s, Number of times of measurement: 3 times, Measurement time: 180 seconds, Refractive index: 1.5, and the like, for example.

The weight average molecular weight in terms of polystyrene to be measured by gel permeation chromatography (GPC) of the polymer constituting the polymer particles is preferably 1,000 or more and 2,000,000 or less. The content (% by mass) of the polymer particles in the ink is preferably 3% by mass or more and 20% by mass or less, more preferably 3% by mass or more and 15% by mass or less, and particularly preferably 5% by mass or more and 10% by mass or less based on the entire ink mass. The content (% by mass) of the polymer particles based on the entire ink mass is preferably 0.2 times or more and 100 times or less in terms of a mass ratio (Polymer particles/Pigment) to the content (% by mass) of the pigment.

Monomers to be used for preparing the polymer forming the polymer particles may be any monomer insofar as the monomer can be used in polymerization methods, such as an emulsion polymerization method, a suspension polymerization method, and a dispersion polymerization method. The polymer is classified into an acryl type, a vinyl acetate type, an ester type, an ethylene type, a urethane type, a synthetic rubber type, a vinyl chloride type, a vinylidene chloride type, an olefin type, and the like based on a difference in the monomers, for example. The polymer forming the polymer particles is suitably an anionic polymer and more suitably an acrylic polymer or a urethane polymer.

Examples of monomers to be used for preparing the acrylic polymer include, for example, α,β-unsaturated carboxylic acids and salts thereof, such as (meth)acrylic acid, maleic acid, crotonic acid, angelic acid, itaconic acid, and fumaric acid; α,β-unsaturated carboxylic acid ester compounds, such as ethyl(meth)acrylate, methyl(meth)acrylate, butyl(meth)acrylate, methoxyethyl(meth)acrylate, ethoxyethyl (meth)acrylate, diethylene glycol(meth)acrylate, triethylene glycol(meth)acrylate, tetraethylene glycol(meth) acrylate, polyethylene glycol(meth)acrylate, methoxydiethylene glycol(meth)acrylate, methoxytriethylene glycol(meth)acrylate, methoxytetraethylene glycol (meth)acrylate, methoxypolyethylene glycol(meth)acrylate, cyclohexyl(meth)acrylate, isobornyl(meth)acrylate, N,N-dimethylaminopropyl(meth)acrylate, monobutyl maleate, and dimethyl itaconate; α,β-unsaturated carboxylic acid alkylamide compounds, such as (meth)acrylamide, dimethyl (meth)acrylamide, N,N-dimethylethyl (meth)acrylamide, N,N-dimethylpropyl (meth)acrylamide, isopropyl(meth) acrylamide, diethyl(meth)acrylamide, (meth)acryloyl morpholine, maleic acid monoamide, and crotonic acid methylamide; aryl group-containing α,β-ethylenic unsaturated compounds, such as styrene, α-methylstyrene, phenylvinyl acetate, benzyl(meth)acrylate, and 2-phenoxyethyl(meth) acrylate; and ester compounds of polyfunctional alcohols, such as ethylene glycol diacrylate and polypropylene glycol dimethacrylate.

The acrylic polymer may be a homopolymer or a copolymer. The copolymer may be a random copolymer or a block copolymer. The acrylic polymer is suitably a polymer synthesized using hydrophilic monomers and hydrophobic monomers. Examples of the hydrophilic monomers include the α,β-unsaturated carboxylic acids and salts thereof. Examples of the hydrophobic monomers include the α,β-unsaturated carboxylic acid ester compounds and the aryl group-containing α,β-ethylenic unsaturated compounds.

The urethane polymer is a polymer prepared by reacting polyisocyanate which is a compound having two or more isocyanate groups and polyol which is a compound having two or more hydroxy groups. In the present invention, any urethane polymer obtained by reacting known polyisocyanates and known polyols can be used.

Examples of the structure of the polymer particles include a monolayer structure and multi layer structures, such as a core-shell structure. In the present invention, it is suitable to use polymer particles having a multi layer structure and it is more suitable to use polymer particles having a core-shell structure. In the polymer particles having a core-shell structure, the functions of the core portion and the shell portion are clearly separated. The polymer particles having such a core-shell structure are suitable because a larger number of functions can be imparted to ink as compared with polymer particles having a monolayer structure.

Pigment Dispersant

In ink, a pigment dispersant for dispersing a pigment in the ink can be blended. As the pigment dispersant, pigment dispersants for use in known inkjet ink can be used. In particular, it is suitable to use a water-soluble polymer having both a hydrophilic portion and a hydrophobic portion in the molecular structure as the pigment dispersant. A pigment dispersant containing a water-soluble polymer obtained by copolymerizing hydrophilic monomers and hydrophobic monomers is particularly suitable. Examples of the hydrophilic monomers include acrylic acid, methacrylic acid, maleic acid, and the like having a carboxy machine which is an anionic functional group. Examples of the hydrophobic monomers include styrene, styrene derivatives, alkyl(meth)acrylate, benzyl(meth)acrylate, and the like.

The acid value of the water-soluble polymer to be used as the pigment dispersant is preferably 50 mgKOH/g or more and 550 mgKOH/g or less. The weight average molecular weight of the water-soluble polymer is preferably 1,000 or more and 50,000 or less.

The mass ratio of the pigment and the pigment dispersant contained in ink is preferably Pigment:Pigment dispersant=1:0.1 to 1:3. It is also suitable to use a so-called self-dispersibility pigment which is obtained by modifying the surface of a pigment itself to make the pigment dispersible in ink in place of the use of a pigment dispersant.

Other Components

In ink, various additives, such as a pH adjuster, an antirust, an antiseptic, an antifungal agent, an antioxidant, a reduction inhibitor, a neutralizer of water-soluble polymer, and salts may be blended, as necessary.

Moreover, surfactants can be blended in ink in order to adjust the surface tension. As the surfactants, any surfactant can be used insofar as the surfactant does not adversely affect ink, e.g., reducing the storage stability. Examples of usable surfactants include, for example, anionic surfactants, such as fatty acid salts, higher alcohol sulfate ester salts, liquid fatty oil sulfate ester salts, and alkylaryl sulfonate salts; and nonionic surfactants, such as polyoxy ethylene alkyl esters, polyoxy ethylene sorbitan alkyl esters, acetylene alcohols, and acetylene glycols. These surfactants can be used alone or in combination of two or more kinds thereof.

Image Recording Method

The image recording method according to an aspect of the present invention has a process (1) of applying the above-described ink to a recording medium and a process (2) of applying the above-described liquid composition to the recording medium in such a manner as to be overlapped with a region to which the ink is applied. It is also suitable to further have a process of heating a recording medium before and/or after the process (1). In the process (1), it is suitable to eject the ink from a recording head of an inkjet ink system to apply the ink to the recording medium. In the process (2), the liquid composition may be ejected from the recording head of an inkjet ink system to be applied to the recording medium or may be applied to the recording medium using application members, such as an application roller. Examples of an apparatus for implementing the image recording method according to an aspect of the present invention include, for example, a known inkjet ink recording apparatus, an apparatus in which an application mechanism is provided in an inkjet ink recording apparatus, and the like.

Examples of the recording head to be placed in the inkjet ink recording apparatus include a recording head of a system including ejecting liquid due to the action of mechanical energy, a recording head of a system including ejecting liquid due to the action of thermal energy, and the like. In the present invention, it is suitable to use the recording head of a system including ejecting liquid due to the action of thermal energy.

The application amount of the liquid composition to a recording medium may be adjusted as appropriate in accordance with the configuration of the ink to be reacted with the liquid composition. From the viewpoint of the uniformity, fixability, and the like of images to be obtained, the application amount of the liquid composition to a recording medium is preferably 0.2 g/m$^2$ or more and 10.0 g/m$^2$ or less and more preferably 0.8 g/m$^2$ or more and 6.0 g/m$^2$ or less. When the region to which the liquid composition is applied is only one part with respect to the size (area: m$^2$) of a recording medium, the application amount (g/m$^2$) of the liquid composition calculated based on the assumption that the liquid composition is applied to the entire surface of the recording medium is suitably within the range mentioned above.

When the liquid composition is applied to a recording medium using application members, such as an application roller, it is suitable to determine the process order in such a manner that the process (1) is carried out, and then the process (2) is carried out and also to set to the viscosity of the liquid composition to be higher than the viscosity of the ink. When the viscosity of the liquid composition is higher than the viscosity of the ink, the liquid composition is likely to stay near the surface of the recording medium, so that the liquid composition is likely to be effectively reacted with the ink. Therefore, the ink can be effectively made unstable by the liquid composition with a small application amount, so that the fixability and the like of an image can be further increased.

The pigment in the ink after reacting with the liquid composition stays near the surface of the recording medium and water, the organic solvent, and the like in the ink promptly permeate in the depth direction of the recording medium. More specifically, it is suitable to separate the ink after reacting with the liquid composition into a solid and a liquid, and therefore it is suitable that the viscosity of the ink is low from the viewpoint of the fixability and the like of images. When the liquid composition is applied to a recording medium using application members, such as an application roller, the viscosity of the liquid composition is preferably 3 mPa·s or more and 10 Pa·s or less and more preferably 10 mPa·s or more and 1 Pa·s or less. The viscosity of the ink is preferably 1 mPa·s or more and 15 mPa·s or less.

When both the liquid composition and the ink are ejected from the recording head of an inkjet ink system to be applied to a recording medium, either the process (1) or the process (2) may be carried out first. Furthermore, the process (1) and the process (2) may be carried out in combination. In particular, it is suitable to determine the process order in such a manner that the process (1) is carried out, and then the process (2) is carried out.

From the viewpoint of the ejection property from the recording head of an inkjet ink system, both the viscosity of the liquid composition and the viscosity of the ink are preferably 1 mPa·s or more and 15 mPa·s or less and more preferably 1 mPa·s or more and 5 mPa·s or less. Both the surface tension of the liquid composition and the surface tension of the ink are preferably 15 mN/m or more and 50 mN/m or less. It is suitable for the surface tension of the liquid composition to be higher than the surface tension of the ink within the range where the liquid composition can be ejected from the recording head of an inkjet ink system. Thus, the liquid composition can be prevented from blurring in a place different from a recording area formed with ink and also the liquid composition and the ink can be efficiently reacted with each other on a recording medium.

EXAMPLES

Hereinafter, the present invention is described in more detail with reference to Examples and Comparative Examples and is not limited to Examples described below without deviating the gist thereof. With respect to the amount of components, "part(s)" and "%" are all based on mass unless otherwise specified.

Preparation of Liquid Composition

Components were mixed in accordance with the compositions shown in Table 1 to prepare liquid compositions 1 to 29. 90 mL of each prepared liquid composition was placed in a 180 mL fluoropolymer container, and then stored in a 60° C. oven for two weeks to be formed into a liquid composition after long-term storage.

TABLE 1

| | Organic acid | | Organic solvent | | |
|---|---|---|---|---|---|
| | Type | Amount (part) | Type | Amount (part) | Water (part) |
| Liquid composition 1 | Malonic acid | 30 | DEGdM | 20 | 50 |
| Liquid composition 2 | Malic acid | 30 | DEGEM | 20 | 50 |
| Liquid composition 3 | Citric acid | 30 | TEGBM | 20 | 50 |
| Liquid composition 4 | Citric acid | 10 | TEGBM | 20 | 70 |
| Liquid composition 5 | Citric acid | 20 | TEGBM | 20 | 60 |
| Liquid composition 6 | Citric acid | 30 | PEGdM1000 | 20 | 50 |
| Liquid composition 7 | Citric acid | 30 | PEGdM2000 | 20 | 50 |
| Liquid composition 8 | Citric acid | 30 | 2Py | 20 | 50 |
| Liquid composition 9 | Citric acid | 30 | NMP | 20 | 50 |
| Liquid composition 10 | Citric acid | 30 | TeMSu | 20 | 50 |

TABLE 1-continued

| | Organic acid | | Organic solvent | | |
|---|---|---|---|---|---|
| | Type | Amount (part) | Type | Amount (part) | Water (part) |
| Liquid composition 11 | Glutaric acid | 30 | TEGBM | 20 | 50 |
| Liquid composition 12 | Succinic acid | 30 | TEGBM | 20 | 50 |
| Liquid composition 13 | 1,2,3-propane-tricarboxylic acid | 30 | DEGEM | 20 | 50 |
| Liquid composition 14 | Malonic acid Glutaric acid | 15 15 | TEGBM | 20 | 50 |
| Liquid composition 15 | Malonic acid Malic acid | 15 15 | DEGEM | 20 | 50 |
| Liquid composition 16 | Malonic acid | 30 | DEGmB TEGBM | 4 16 | 50 |
| Liquid composition 17 | Glutaric acid | 5 | TEGBM | 20 | 75 |
| Liquid composition 18 | Glutaric acid | 30 | DEGmB | 20 | 50 |
| Liquid composition 19 | Glutaric acid | 30 | 15PD | 20 | 50 |
| Liquid composition 20 | Glutaric acid | 30 | 12HD | 20 | 50 |
| Liquid composition 21 | Malonic acid | 30 | Gly | 20 | 50 |
| Liquid composition 22 | Glutaric acid | 30 | PEG1000 | 20 | 50 |
| Liquid composition 23 | Malic acid | 30 | 15PD | 20 | 50 |
| Liquid composition 24 | Succinic acid | 30 | 12HD | 20 | 50 |
| Liquid composition 25 | 1,2,3-propane-tricarboxylic acid | 30 | DEGmB | 20 | 50 |
| Liquid composition 26 | Malonic acid Glutaric acid | 15 15 | DEGmB | 20 | 50 |
| Liquid composition 27 | Malonic acid | 30 | DEGmB TEGBM | 5 15 | 50 |
| Liquid composition 28 | Glutaric acid | 30 | TEGBM | 5 | 65 |
| Liquid composition 29 | Glutaric acid | 30 | TEGBM | 2 | 68 |

The meaning of each of the abbreviations in Table 1 is shown below.

DEGdM: Diethylene glycol dimethyl ether (Molecular weight of 134)

DEGEM: Diethylene glycol ethyl methyl ether (Molecular weight of 148)

TEGBM: Triethylene glycol butyl methyl ether (Molecular weight of 220)

PEGdM1000: Polyethylene glycol dimethyl ether 1000 (Number-average molecular weight of 1000)

PEGdM2000: Polyethylene glycol dimethyl ether 2000 (Number-average molecular weight of 2000)

2Py: 2-pyrrolidone

NMP: N-methyl pyrrolidone

TeMSu: Tetramethylene sulfone

DEGmB: Diethylene glycol monobutyl ether

15PD: 1,5-pentane diol

12HD: 1,2-hexane diol

Gly: Glycerol

PEG1000: Polyethylene glycol 1000 (Number-average molecular weight of 1000)

Preparation of Black Pigment Dispersion Liquid 10 parts of a pigment, 15 parts of an aqueous polymer solution having a 20% solid content, and 75 parts of pure water were mixed, and then placed in a batch type vertical sand mill (manufactured by Aimex Co., Ltd.). The sand mill was filled with 200 parts of zirconia beads having a diameter of 0.3 mm, and then dispersion treatment was carried out for 5 hours under water-cooling to obtain a dispersion liquid. As the pigment, carbon black (Trade name "Monarch 1100", manufactured by Cabot) was used. As the aqueous polymer solution, an aqueous solution of a styrene-ethyl acrylate-acrylic acid copolymer (Acid value: 150 mgKOH/g, Weight average molecular weight: 8,000, Neutralizer: potassium hydroxide) was used. The obtained dispersion liquid was placed in a centrifugal separator to remove coarse particles, whereby a black pigment dispersion liquid having a pigment concentration of about 10% was obtained.

Preparation of Cyan Pigment Dispersion Liquid

A cyan pigment dispersion liquid having a pigment concentration of about 10% was obtained in the same manner as in the black pigment dispersion liquid described above, except using C.I. pigment blue 15:3 as the pigment.

Aqueous Solution of Water-Soluble Polymer

An aqueous solution (Solid content of 20%) of a styrene-butyl acrylate-acrylic acid copolymer (Acid value: 121 mgKOH/g, Weight average molecular weight: 7,000, Neutralizer: potassium hydroxide) was used as an aqueous solution of a water-soluble polymer 1.

Preparation of Polymer Particle Dispersion 18 parts of ethyl methacrylate, 2 parts of 2,2'-azobis(2-methylbutyronitrile), and 2 parts of n-hexadecane were mixed, and then stirred for 0.5 hour to obtain a mixture. The obtained mixture was added dropwise to 78 parts of a 6% aqueous solution of a styrene-butyl acrylate-acrylic acid copolymer (Acid value: 130 mgKOH/g, Weight average molecular weight: 7,000), stirred for 0.5 hour, and then irradiated with ultrasonic waves for 3 hours using an ultrasonic wave emitting machine. Subsequently, a polymerization reaction was performed at 80° C. for 4 hours under a nitrogen atmosphere. The resultant substance was cooled to room temperature, and then filtered to obtain a polymer particle dispersion 1 having a polymer content of 40.0%. The weight average molecular weight of the polymer constituting the polymer particles in the obtained polymer particle dispersion 1 was 250,000 and the volume average particle diameter ($D_{50}$) of the polymer particles was 200 nm.

Preparation of Ink

Components were mixed in accordance with the compositions (Total: 100 parts) shown in Table 2, sufficiently stirred, and then filtered under pressure through a microfilter having a pore size of 3.0 μm (manufactured by Fujifilm Corporation), whereby a black ink 1, a black ink 2, a cyan ink 1, and a cyan ink 2 were prepared.

TABLE 2

|  | Black pigment dispersion liquid | Cyan pigment dispersion liquid | Aqueous solution of water-soluble polymer 1 | Polymer particle dispersion 1 | Glycerol | Surfactant*[1] | Water |
|---|---|---|---|---|---|---|---|
| Black ink 1 | 20 | — | 17 | — | 7 | 1 | Balance |
| Cyan ink 1 | — | 20 | 17 | — | 7 | 1 | Balance |
| Black ink 2 | 20 | — | 17 | 25 | 7 | 1 | Balance |
| Cyan ink 2 | — | 20 | 17 | 25 | 7 | 1 | Balance |

*[1]Nonionic surfactant (Trade name "Acetylenol E100", manufactured by Kawaken Fine Chemicals Co., Ltd.)

Images were recorded using the prepared liquid compositions after long-term storage, black ink, and cyan ink in the combinations shown in Table 3.

TABLE 3

|  | Liquid composition | Ink |
|---|---|---|
| Example 1 | Liquid composition 1 | Cyan ink 2/Black ink 2 |
| Example 2 | Liquid composition 2 | Cyan ink 2/Black ink 2 |
| Example 3 | Liquid composition 3 | Cyan ink 2/Black ink 2 |
| Example 4 | Liquid composition 4 | Cyan ink 2/Black ink 2 |
| Example 5 | Liquid composition 5 | Cyan ink 2/Black ink 2 |
| Example 6 | Liquid composition 6 | Cyan ink 2/Black ink 2 |
| Example 7 | Liquid composition 7 | Cyan ink 2/Black ink 2 |
| Example 8 | Liquid composition 8 | Cyan ink 2/Black ink 2 |
| Example 9 | Liquid composition 9 | Cyan ink 2/Black ink 2 |
| Example 10 | Liquid composition 10 | Cyan ink 2/Black ink 2 |
| Example 11 | Liquid composition 11 | Cyan ink 2/Black ink 2 |
| Example 12 | Liquid composition 12 | Cyan ink 2/Black ink 2 |
| Example 13 | Liquid composition 13 | Cyan ink 2/Black ink 2 |
| Example 14 | Liquid composition 14 | Cyan ink 2/Black ink 2 |
| Example 15 | Liquid composition 15 | Cyan ink 2/Black ink 2 |
| Example 16 | Liquid composition 16 | Cyan ink 2/Black ink 2 |
| Example 17 | Liquid composition 3 | Cyan ink 1/Black ink 1 |
| Example 18 | Liquid composition 28 | Cyan ink 2/Black ink 2 |
| Comparative Example 1 | Liquid composition 17 | Cyan ink 2/Black ink 2 |
| Comparative Example 2 | Liquid composition 18 | Cyan ink 2/Black ink 2 |
| Comparative Example 3 | Liquid composition 19 | Cyan ink 2/Black ink 2 |
| Comparative Example 4 | Liquid composition 20 | Cyan ink 2/Black ink 2 |
| Comparative Example 5 | Liquid composition 21 | Cyan ink 2/Black ink 2 |
| Comparative Example 6 | Liquid composition 22 | Cyan ink 2/Black ink 2 |
| Comparative Example 7 | Liquid composition 23 | Cyan ink 2/Black ink 2 |
| Comparative Example 8 | Liquid composition 24 | Cyan ink 2/Black ink 2 |
| Comparative Example 9 | Liquid composition 25 | Cyan ink 2/Black ink 2 |
| Comparative Example 10 | Liquid composition 26 | Cyan ink 2/Black ink 2 |
| Comparative Example 11 | Liquid composition 27 | Cyan ink 2/Black ink 2 |
| Comparative Example 12 | Liquid composition 29 | Cyan ink 2/Black ink 2 |

Recording of Images and Evaluation of Image Blurring

An ink cartridge was filled with each ink, and then attached to an image recording apparatus illustrated in FIGURE. The liquid composition after long-term storage was applied using an application roller 3 to a recording medium 1 placed on a conveyance stage 2. The application amount of the liquid composition was 1.0 g/m². The ink was ejected to the recording medium 1, to which the liquid composition was applied, from an inkjet recording head 4 according to the procedure described below to record images.

With an image recording apparatus used in Examples above, the condition where one ink droplet of 3.0 ng was applied to a unit region of $\frac{1}{1,200}$ inch×$\frac{1}{1,200}$ inch with a resolution of 1,200 dpi×1,200 dpi is defined as a recording duty of 100%. The cyan ink was used for a first landing ink and the black ink was used for a second landing ink. Then, solid images having a recording duty of 100% were recorded in a 5 cm×5 cm region with the first landing ink. Then, the second landing ink was made to land on the solid images (drawing portions) to record evaluation images. The time difference between the landing inks was set to 50 msec. The presence or absence of blurring of dots of the second landing ink on the solid images was observed using an optical microscope to evaluate image blurring in accordance with the following criteria.

AA: No blurring and very good
A: No blurring and good
B: Partial blurring and within tolerance range
C: Partial blurring and out of tolerance range
D: Blurring Evaluation of Image Density Unevenness In the printing method described above, continuous printing was performed for 7 hours, solid images having 100% Duty were formed in a 5 cm×5 cm region using the cyan ink, and then the density unevenness of the solid images was observed under an optical microscope.

A: No density unevenness and very good
B: Partial density unevenness and within tolerance range
C: Density unevenness and out of tolerance range

TABLE 4

|  | Image blurring | Image density unevenness |  | Image blurring | Image density unevenness |
|---|---|---|---|---|---|
| Example 1 | A | A | Comparative Example 1 | C | B |
| Example 2 | A | A | Comparative Example 2 | C | B |
| Example 3 | A | A | Comparative Example 3 | D | B |
| Example 4 | B | A | Comparative Example 4 | D | B |
| Example 5 | A | A | Comparative Example 5 | D | B |
| Example 6 | AA | A | Comparative Example 6 | C | B |
| Example 7 | AA | A | Comparative Example 7 | D | B |
| Example 8 | B | A | Comparative Example 8 | D | B |
| Example 9 | B | A | Comparative Example 9 | D | B |
| Example 10 | B | A | Comparative Example 10 | C | B |
| Example 11 | A | A | Comparative Example 11 | C | B |
| Example 12 | A | A | Comparative Example 12 | B | C |
| Example 13 | A | A |  |  |  |

TABLE 4-continued

| | Image blurring | Image density unevenness | Image blurring | Image density unevenness |
|---|---|---|---|---|
| Example 14 | A | A | | |
| Example 15 | A | A | | |
| Example 16 | B | A | | |
| Example 17 | B | A | | |
| Example 18 | A | B | | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-111946, filed May 30, 2014 which is hereby incorporated by reference herein in its entirety.

What is claimed is:

1. An image recording method comprising:
applying an ink comprising a pigment to a recording medium; and
applying a liquid composition comprising organic acid and one or more organic solvents to the recording medium in such a manner as to be at least partially overlapped with a region to which the ink is applied, wherein
a content (% by mass) of the organic acid in the liquid composition is 10% by mass or more based on a total amount of the liquid composition,
a content (% by mass) of the one or more organic solvents in the liquid composition is 5% by mass or more based on the total amount of the liquid composition,
a content (% by mass) of the one or more organic solvents having a hydroxyl group in the liquid composition is 4% by mass or less based on the total amount of the liquid composition,
wherein the one or more organic solvents comprises a glycol diether having a molecular weight of 1000 or more.

2. The image recording method according to claim 1, wherein the liquid composition does not contain the organic solvent having a hydroxyl group.

3. The image recording method according to claim 1, wherein the content (% by mass) of the organic acid in the liquid composition is 20% by mass or more based on the total amount of the liquid composition.

4. The image recording method according to claim 1, wherein the ink further contains polymer particles.

5. The image recording method according to claim 1, wherein the one or more organic solvents comprises two or more organic solvents.

6. The image recording method according to claim 1, wherein the one or more organic solvents comprises an organic solvent having a hydroxyl group.

7. The image recording method according to claim 1, wherein the one or more organic solvents comprises a first organic solvent not having a hydroxyl group and a second organic solvent having a hydroxyl group.

8. The image recording method according to claim 7, wherein the first organic solvent is the glycol diether.

9. The image recording method according to claim 1, wherein the one or more organic solvents consists of the glycol diether.

10. The image recording method according to claim 1, wherein the content (% by mass) of the one or more organic solvents in the liquid composition is 60% by mass or less based on the total amount of the liquid composition.

11. The image recording method according to claim 1, wherein the content (% by mass) of the one or more organic solvents in the liquid composition is 40% by mass or less based on the total amount of the liquid composition.

12. The image recording method according to claim 11, wherein the content (% by mass) of the one or more organic solvents in the liquid composition is 10% by mass or more based on the total amount of the liquid composition.

13. The image recording method according to claim 1, wherein the content (% by mass) of the one or more organic solvents in the liquid composition is 30% by mass or less based on the total amount of the liquid composition.

14. The image recording method according to claim 13, wherein the content (% by mass) of the one or more organic solvents in the liquid composition is 15% by mass or more based on the total amount of the liquid composition.

15. The image recording method according to claim 1, wherein the glycol diether is selected from the group consisting of diethylene glycol diethylether, triethylene glycol butyl methyl ether, tetraethylene glycol dimethyl ether, propylene glycol dimethyl ether, dipropylene glycol dimethyl ether, and polyethylene glycol dimethyl ether.

* * * * *